(12) United States Patent
Zhan et al.

(10) Patent No.: US 10,118,318 B2
(45) Date of Patent: Nov. 6, 2018

(54) TEMPERATURE REGULATION MASK AND ALIGNMENT LAYER PRE-CURING DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hongming Zhan, Beijing (CN); Lifeng Lin, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 575 days.

(21) Appl. No.: 14/549,046

(22) Filed: Nov. 20, 2014

(65) Prior Publication Data

US 2015/0367537 A1 Dec. 24, 2015

(30) Foreign Application Priority Data

Jun. 18, 2014 (CN) .......................... 2014 1 0273040

(51) Int. Cl.
*B29C 35/02* (2006.01)
*B29L 31/34* (2006.01)

(52) U.S. Cl.
CPC .......... *B29C 35/0266* (2013.01); *B29C 35/02* (2013.01); *B29L 2031/3475* (2013.01)

(58) Field of Classification Search
CPC .................................................. B29C 35/0266
See application file for complete search history.

(56) References Cited

U.S. PATENT DOCUMENTS

2009/0227057 A1* 9/2009 Suzuki ................ H01L 27/1214
438/34

* cited by examiner

*Primary Examiner* — Ryan M Ochylski
(74) *Attorney, Agent, or Firm* — Nath, Goldberg & Meyer; Joshua B. Goldberg

(57) ABSTRACT

The invention discloses a temperature regulation mask and an alignment layer pre-curing device, and is related to the field of manufacturing a liquid crystal display panel. Said temperature regulation mask is suitable for the alignment layer pre-curing device for pre-curing an alignment layer, and includes a base and a pattern arranged on the base. A pattern region of said temperature regulation mask has a different thermal conductivity from a thermal conductivity of a non-pattern region of said temperature regulation mask. A position of the one having a lower thermal conductivity among the pattern region and the non-pattern region of said temperature regulation mask corresponds to a position of said alignment layer corresponding to a metallic wiring region. The present invention can obtain an alignment layer with even thickness and improve a display quality.

8 Claims, 3 Drawing Sheets

TEMPERATURE REGULATION MASK AND ALIGNMENT LAYER PRE-CURING DEVICE

FIELD OF THE INVENTION

The present invention is related to the field of manufacturing a liquid crystal display panel, and especially to a temperature regulation mask and an alignment layer pre-curing device including the temperature regulation mask.

BACKGROUND OF THE INVENTION

In the process of pre-curing polyimide (PI) used as a liquid crystal alignment layer, the evenness of the thickness of the PI may be unsatisfied due to differences among actual pre-curing conditions at various positions on a substrate. For example, in a region of the substrate where metallic wirings are intensive (such as a Vcom wiring region at an edge of a display pixel region), the actual temperature of its surface would be high. In the pre-curing process after the application of PI solution, the solvent in a region having a higher surface temperature is volatilized quickly. A level of PI solution after the volatilization is lowered and new PI solution will be supplemented immediately. Therefore, a height of the PI in the region where metallic wirings are intensive is locally higher than a normal value, while the height of the PI in the display pixel region at its edge is locally lower than the normal value. As a result, after pre-curing, a PI halation region (Halo region) may be formed in the region where metallic wirings are intensive, influencing a display effect.

FIG. 1 is a schematic view showing an alignment layer pre-curing device in the prior art. A pre-curing heating plate 1 is heated with uniform temperature, a substrate 2 has a metallic wiring region 3 provided thereon, and an alignment layer 4 is applied on the substrate 2. In the process of heating the pre-curing heating plate 1, the actual surface temperature of the metallic wiring region 3 is higher than the surface temperature of remaining region on the substrate 2, such that a PI halation region 5 may be formed in the former region. In the practical operation in the production line, unqualified products would have obvious PI halation phenomena in their metallic wiring regions. This has indicated that uniformly heating the pre-curing heating plate could not ensure the alignment layer on the substrate surface having various pattern designs is uniformly cured.

SUMMARY OF THE INVENTION

An object of the invention is to provide a temperature regulation mask and an alignment layer pre-curing device, for addressing technical problems in the prior art that the evenness of the thickness of the alignment layer after curing is poor and thus a display effect is influenced.

To address the above technical problems, according to a first aspect of the invention, there is provided a temperature regulation mask suitable for an alignment layer pre-curing device for pre-curing an alignment layer. Said temperature regulation mask includes a base and a pattern arranged on the base. A pattern region of said temperature regulation mask has a different thermal conductivity from a thermal conductivity of a non-pattern region of said temperature regulation mask, and a position of the one having a lower thermal conductivity among the pattern region of said temperature regulation mask and the non-pattern region of said temperature regulation mask corresponds to a position of said alignment layer corresponding to a metallic wiring region.

Preferably, the pattern region of said temperature regulation mask has a lower thermal conductivity than the thermal conductivity of the non-pattern region of said temperature regulation mask, and a position of the pattern region of said temperature regulation mask corresponds to the position of said alignment layer corresponding to the metallic wiring region. In this case, said base is made of a glass, and said pattern region is made of an ink or a resin.

Preferably, the non-pattern region of said temperature regulation mask has a lower thermal conductivity than a thermal conductivity of the pattern region of said temperature regulation mask, and a position of the non-pattern region of said temperature regulation mask corresponds to the position of said alignment layer corresponding to the metallic wiring region. In this case, said base is made of a glass, and said pattern region is made of a metal.

Preferably, a plurality of pattern regions are provided on the base of said temperature regulation mask, and said plurality of pattern regions have various thermal conductivities.

Preferably, a position of the one having the highest thermal conductivity among the plurality of pattern regions and the non-pattern region of said temperature regulation mask corresponds to a position of said alignment layer not corresponding to the metallic wiring region.

Preferably, a position of the one having the lowest thermal conductivity among the plurality of pattern regions and the non-pattern region of said temperature regulation mask corresponds to a position of said alignment layer corresponding to the most intensive metallic wiring region.

According to a second aspect of the invention, there is also provided an alignment layer pre-curing device for pre-curing an alignment layer formed on a substrate. Said alignment layer pre-curing device includes a pre-curing heating plate and a temperature regulation mask. Said temperature regulation mask is the temperature regulation mask as discussed above according to the invention and arranged between said pre-curing heating plate and said substrate.

Preferably, the pattern region of said temperature regulation mask is formed into a shape of rectangular frame, the pattern region of said temperature regulation mask has a lower thermal conductivity than a thermal conductivity of remaining region of said temperature regulation mask except for the pattern region, and a position of said pattern region corresponds to a position of the metallic wiring region on the periphery of a display pixel region on said substrate.

In the pre-curing heating device according to the invention, the temperature regulation mask, on which the pattern region(s) is (are) formed, is additionally provided between the pre-curing heating plate and the substrate to be heated. Temperatures at various positions on the substrate to be heated may be balanced by adjusting the thermal conductivity of the pattern region of said temperature regulation mask, so as to allow the alignment layer solvent on the substrate surface to be volatilized uniformly, thereby obtaining an alignment layer with even thickness and improving a display quality.

BRIEF DESCRIPTION OF THE DRAWINGS

With reference to the drawings, preferred embodiments of the invention will be further described. It should be noted that the drawings constitute a part of the specification and are used for describing the invention together with the following embodiments, but should not be considered as a limitation to the invention. In the drawings.

DETAILED DESCRIPTION OF THE EMBODIMENTS

Hereafter, embodiments of the invention will be described in detail in conjunction with the drawings. It should be understood that the embodiments set forth herein is merely for the purpose of illustration and explanation of the invention and not for limiting the invention.

Figure 1:
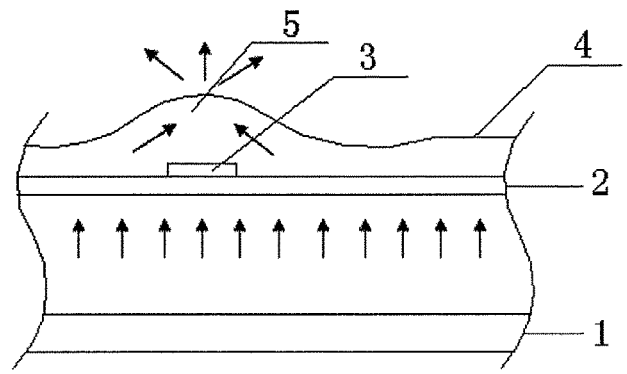
FIG. 1 is a schematic view showing an alignment layer pre-curing device in the prior art.
Figure 2:
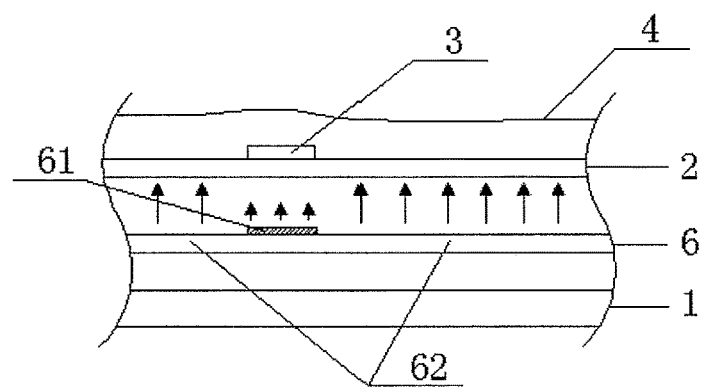
FIG. 2 is a schematic view showing an alignment layer pre-curing device according to one embodiment of the invention.
Figure 3:
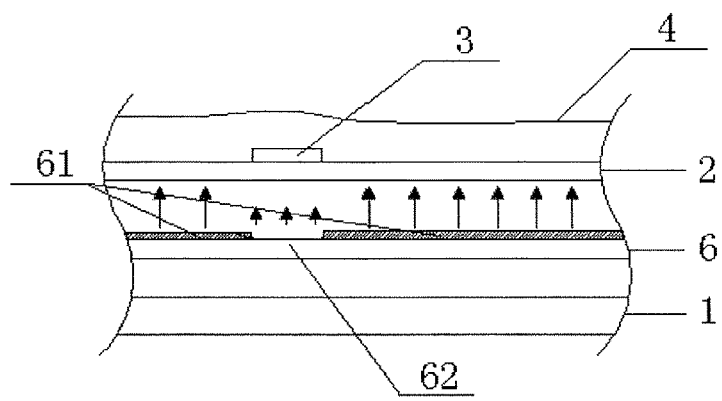
FIG. 3 is a schematic view showing an alignment layer pre-curing device according to another embodiment of the invention.

First, the invention provides a temperature regulation mask suitable for an alignment layer pre-curing device for pre-curing an alignment layer. As shown in FIGS. 2 and 3, a temperature regulation mask 6 is arranged on a pre-curing heating plate 1. The temperature regulation mask 6 may include a base and a pattern arranged on the base. The region of the temperature regulation mask 6 on which the pattern is provided (hereafter referred to as a pattern region 61) may have a different thermal conductivity from a thermal conductivity of the region of the temperature regulation mask 6 on which patterns are not provided (hereafter referred to as a non-pattern region 62). The temperature over the temperature regulation mask 6 heated by the pre-curing heating plate 1 may be controlled by adjusting the thermal conductivity of the pattern region 61 of the temperature regulation mask 6. Further, the adjustment of the thermal conductivity of the pattern region 61 of the temperature regulation mask 6 may be achieved by appropriately selecting a material employed for the pattern region 61. A position of the one having a lower thermal conductivity among the pattern region 61 of the temperature regulation mask 6 and the non-pattern region 62 of the temperature regulation mask 6 corresponds to a position of the alignment layer 4 corresponding to a metallic wiring region 3.

Since metallic wirings in the metallic wiring region 3 of the substrate 2 have a relative high thermal conductivity, compared to other position, the metallic wiring region 3 could be easier to gather heat. Alignment layer solvent is volatilized quickly at the position of the alignment layer 4 corresponding to the metallic wiring region 3, which may readily cause the thickness of the alignment layer to be uneven after curing. Therefore, the thermal conductivity of the pattern region 61 of the temperature regulation mask 6 is adjusted, such that the position of the one having a lower thermal conductivity among the pattern region 61 and the non-pattern region 62 corresponds to the position of the metallic wiring region 3. Since thermal transmission is slow in a region having a low thermal conductivity, it is possible to reduce the heat transferred to the metallic wiring region 3, to decrease the temperature of the metallic wiring region 3, to balance temperatures at various positions on the substrate 2 and to allow the alignment layer solvent on the surface of the substrate 2 to be volatilized uniformly, thereby obtaining an alignment layer 4 with even thickness and improving a display quality.

In one case of the invention, as shown in FIG. 2, the pattern region 61 of the temperature regulation mask 6 has a lower thermal conductivity than a thermal conductivity of the non-pattern region 62, and the position of the pattern region 61 of the temperature regulation mask 6 corresponds to the position of the alignment layer 4 corresponding to the metallic wiring region 3. In this case, the non-pattern region 62 (in other words, the base of the temperature regulation mask 6) is generally made of a glass, while the pattern region 61 may be made of a material having lower heat-conducting property relative to the glass, such as an ink or a resin, in such a manner that the alignment layer on the surface of the substrate 2 can be uniformly cured.

In another case of the invention, as shown in FIG. 3, the non-pattern region 62 of the temperature regulation mask 6 has a lower thermal conductivity than a thermal conductivity of the pattern region 61, and the position of the non-pattern region 62 corresponds to the position of the alignment layer 4 corresponding to the metallic wiring region 3. In this case, the non-pattern region 62 (in other words, the base of the temperature regulation mask 6) is generally made of a glass, while the pattern region 61 may be made of a material having higher heat-conducting property relative to the glass, such as a metal, in such a manner that the alignment layer on the surface of the substrate 2 can be uniformly cured. Particularly, the pattern region 61 may be made of a metal having relative high heat-conducting property, such as Cu, Al and Fe.

In the invention, the pattern region 61 may be formed onto the base of the temperature regulation mask 6 by a printing process. Alternatively, the pattern region 61 may be formed onto the base of the temperature regulation mask 6 by a photolithography process or a sputtering process, the photolithography process including methods such as coating.

Further, a plurality of pattern regions 61 may be provided on the base of the temperature regulation mask 6. The plurality of pattern regions 61 of the temperature regulation mask 6 may have various thermal conductivities, each of which is different from the thermal conductivity of the non-pattern region 62. Particularly, in order that the plurality of pattern regions 61 have various thermal conductivities, the plurality of pattern regions 61 may be made of materials with different thermal conductivities, respectively, and formed on the base of the temperature regulation mask 6, or the plurality of pattern regions 61 may be made by the same material with different thicknesses, respectively.

In this case, the position of the one having the highest thermal conductivity among the plurality of pattern regions 61 and the non-pattern region 62 of the temperature regulation mask 6 corresponds to the position of the alignment layer 4 not corresponding to the metallic wiring region 3, while the position of the one having the lowest thermal conductivity among the plurality of pattern regions 61 and the non-pattern region 62 of the temperature regulation mask 6 corresponds to the position of the alignment layer 4 corresponding to the most intensive metallic wiring region 3. That is, the more intensive the metallic wirings are, the more quickly the alignment layer solvent is volatilized. Therefore, a relative low heated temperature is required in the region where the metallic wirings are intensive, and accordingly, the thermal conductivity in the corresponding region of the temperature regulation mask should be lowered.

As shown in FIG. 2 or 3, the invention further provides an alignment layer pre-curing device for pre-curing an alignment layer formed on a substrate. The alignment layer pre-curing device may include a pre-curing heating plate 1 and a temperature regulation mask 6. The temperature regulation mask 6 is the above-discussed temperature regulation mask according to the invention. The temperature regulation mask 6 is arranged between the pre-curing heating plate 1 and a substrate 2.

As described above, the temperature regulation mask 6 may include a base and a pattern arranged on the base. The region of the temperature regulation mask 6 on which the pattern is provided (the pattern region 61) may have a different thermal conductivity from a thermal conductivity of the non-pattern region 62 of the temperature regulation mask 6. The metallic wiring region 3 on the substrate 2 could be easier to gather heat than other position of the substrate 2, which may cause the alignment layer solvent in the metallic wiring region 3 to be volatilized quickly. Therefore, the position of the one having a lower thermal conductivity among the pattern region 61 and the non-pattern region 62 of the temperature regulation mask 6 corresponds to the position of the alignment layer 4 corresponding to the metallic wiring region 3, so as to decrease the heated temperature of the metallic wiring region. As a result, it is possible to achieve a purpose of uniformly volatilizing the alignment layer solvent on a surface of the substrate 2, thereby obtaining an alignment layer 4 with even thickness and improving a display quality.

Hereafter, detailed description will be made by way of taking the cases as shown in FIGS. 2 and 3 as examples, respectively.

In FIG. 2, the position of the pattern region 61 of the temperature regulation mask 6 corresponds to the position of the alignment layer 4 corresponding to the metallic wiring region 3, and the pattern region 61 of the temperature regulation mask 6 has a lower thermal conductivity than a thermal conductivity of the non-pattern region 62. The base of the temperature regulation mask 6 (i.e., the non-pattern region 62) may be made of a glass, while the pattern region 61 may be made of a material having lower heat-conducting property relative to the glass, such as an ink or a resin. The pattern region 61 may be formed onto the substrate by a printing or coating process.

Figure 4:
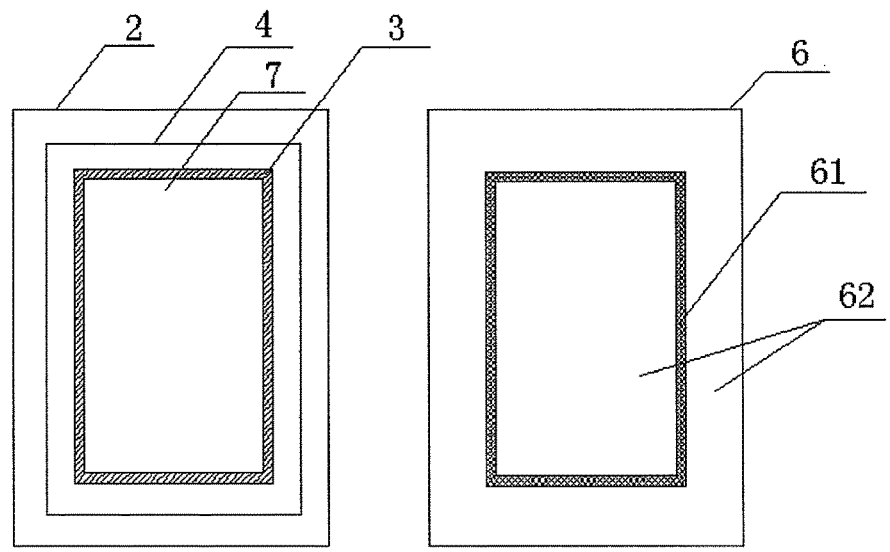
FIG. 4 is a schematic view showing an assembly of a temperature regulation mask and a substrate according to one embodiment of the invention.
Figure 5:
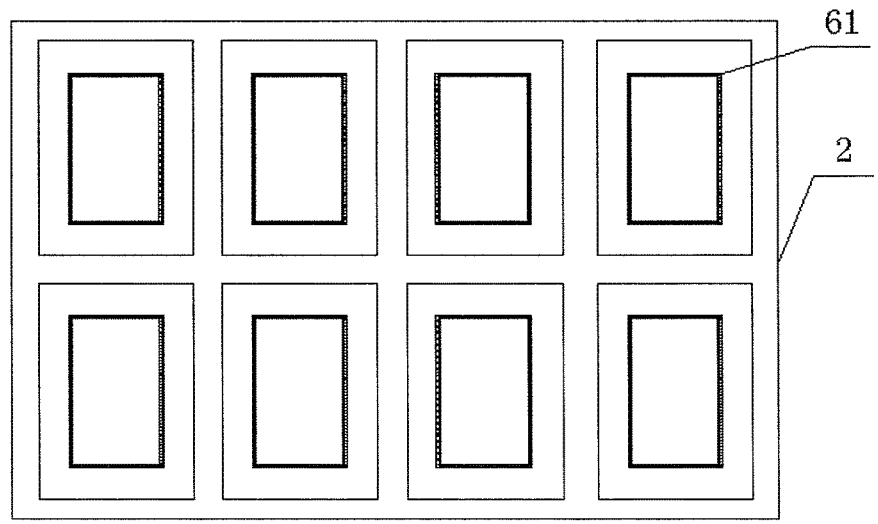
FIG. 5 is a schematic view showing an assembly of a temperature regulation mask and a substrate according to the embodiment of the invention.

FIGS. 4 and 5 are schematic views showing assemblies of the temperature regulation mask 6 and the substrate 2. In the normal case, the substrate 2 has sparse and uniform metallic wirings in a display pixel region 7, and a lap of intensive metallic wirings (i.e., the metallic wiring region 3) surrounds an edge of the display pixel region 7. The metallic wiring region 3 is formed of a mass of intensive metallic wirings. As such, at the edge of the display pixel region 7, a variation in density of the metallic wirings from being uniform to being intensive occurs. A difference of the surface temperatures on the substrate 2 may be formed due to the variation in density of the metallic wirings. From the display pixel region 7 to its outside, the actual surface temperatures on the substrate 2 may vary from a uniform temperature to a higher temperature. Due to the difference of the temperatures, a portion of the alignment layer 4 corresponding to the edge of the display pixel region 7 may be cured unevenly, thereby causing some Moire fringes in display.

In FIG. 4, the pattern region 61 of the temperature regulation mask 6 is formed into a shape of rectangular frame. The pattern region 61 of the temperature regulation mask 6 has a lower thermal conductivity than a thermal conductivity of remaining region of the temperature regulation mask 6 except for the pattern region 61. The position of the rectangular frame (i.e., the pattern region 61) corresponds to the position of the metallic wiring region 3 on the periphery of the display pixel region 7 on the substrate 2.

By means of the temperature regulation mask 6, the metallic wiring region 3 on the surface of the substrate 2 may have the same temperature with other region on the substrate 2, such that the alignment layer 4 on the surface of the substrate 2 can be uniformly cured, thereby improving the evenness of the thickness of the alignment layer 4 and an effect of display.

As it should be explained that, the pattern region 61 is formed into a shape of rectangular frame in the present embodiment, but the pattern region 61 may also have other shape as long as the shape corresponds to the intensive metallic wiring region 3.

In FIG. 3, the position of the non-pattern region 62 corresponds to the position of the alignment layer 4 corresponding to the metallic wiring region 3, and the thermal conductivity of the non-pattern region 62 is lower than that of the pattern region 61 of the temperature regulation mask 6. In this case, the base of the temperature regulation mask 6 (i.e., the non-pattern region 62) may be made of a glass, while the pattern region 61 may be made of a material having higher heat-conducting property relative to the glass, such as a metal. The pattern region 61 may be formed onto the base by a sputtering process, for example.

Figure 6:
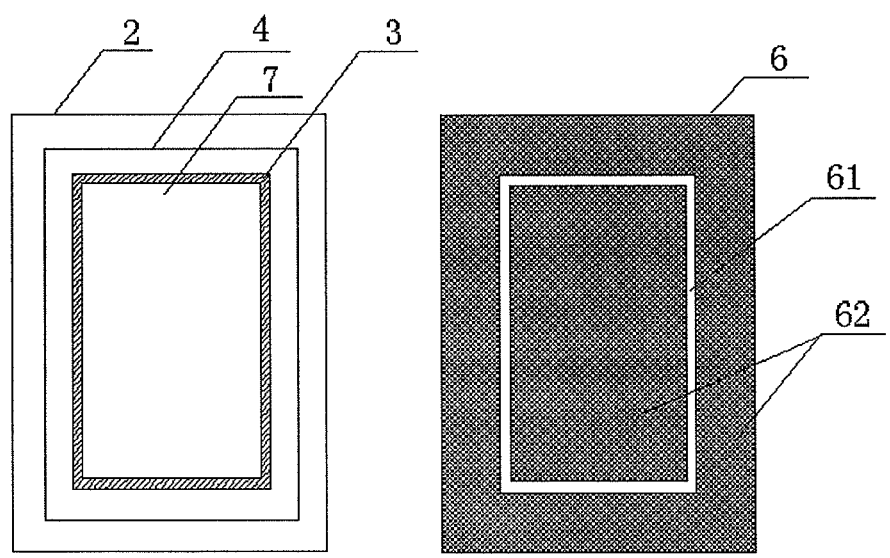
FIG. 6 is a schematic view showing an assembly of a temperature regulation mask and a substrate according to another embodiment of the invention.

FIG. 6 is a schematic view showing an assembly of the temperature regulation mask 6 and the substrate 2. The position of the non-pattern region 62 corresponds to the position of the alignment layer 4 corresponding to the metallic wiring region 3. In this manner, the temperatures at various positions on the substrate can be balanced, so as to uniformly cure the alignment layer.

It should be understood that the above embodiments are merely exemplary embodiments for the purpose of illustrating the principle of the invention, and the invention is not limited thereto. Various modifications and improvements can be made by a person having ordinary skill in the art without departing from the spirit and the essence of the invention. Accordingly, all of the modifications and improvements also fall into the protection scope of the invention.

The invention claimed is:

1. A temperature regulation mask, which is suitable for an alignment layer pre-curing device for pre-curing an alignment layer, wherein,
    the alignment layer pre-curing device comprises a pre-curing heating plate and the temperature regulation mask arranged over the pre-curing heating plate;
    the alignment layer covers a metallic wiring region;
    said temperature regulation mask is arranged between the pre-curing heating plate and the alignment layer and includes a base and a pattern arranged on the base; and
    a pattern region of said temperature regulation mask has a different thermal conductivity from a thermal conductivity of a non-pattern region of said temperature regulation mask, and a position of the one having a lower thermal conductivity among the pattern region of said temperature regulation mask and the non-pattern region of said temperature regulation mask corresponds to a position of said alignment layer corresponding to the metallic wiring region.

2. The temperature regulation mask according to claim 1, wherein, the pattern region of said temperature regulation mask has a lower thermal conductivity than the thermal conductivity of the non-pattern region of said temperature regulation mask, and a position of the pattern region of said temperature regulation mask corresponds to the position of said alignment layer corresponding to the metallic wiring region.

3. The temperature regulation mask according to claim 2, wherein, said base is made of a glass, and said pattern region is made of an ink or a resin.

4. The temperature regulation mask according to claim 1, wherein, the non-pattern region of said temperature regulation mask has a lower thermal conductivity than a thermal conductivity of the pattern region of said temperature regulation mask, and a position of the non-pattern region of said temperature regulation mask corresponds to the position of said alignment layer corresponding to the metallic wiring region.

5. The temperature regulation mask according to claim 4, wherein, said base is made of a glass, and said pattern region is made of a metal.

6. The temperature regulation mask according to claim 1, wherein, a plurality of pattern regions are provided on the base of said temperature regulation mask, and said plurality of pattern regions have various thermal conductivities.

7. The temperature regulation mask according to claim 6, wherein, a position of the one having the highest thermal conductivity among the plurality of pattern regions and the non-pattern region of said temperature regulation mask corresponds to a position of said alignment layer not corresponding to the metallic wiring region.

8. The temperature regulation mask according to claim 6, wherein, a position of the one having the lowest thermal conductivity among the plurality of pattern regions and the non-pattern region of said temperature regulation mask corresponds to a position of said alignment layer corresponding to the most intensive metallic wiring region.

* * * * *